3,090,953
PULSE BURST COMPRESSION RADAR
Robert L. Frank, Great Neck, N.Y., assignor to Sperry
Rand Corporation, a corporation of Delaware
Filed Sept. 27, 1956, Ser. No. 612,915
11 Claims. (Cl. 343—17.1)

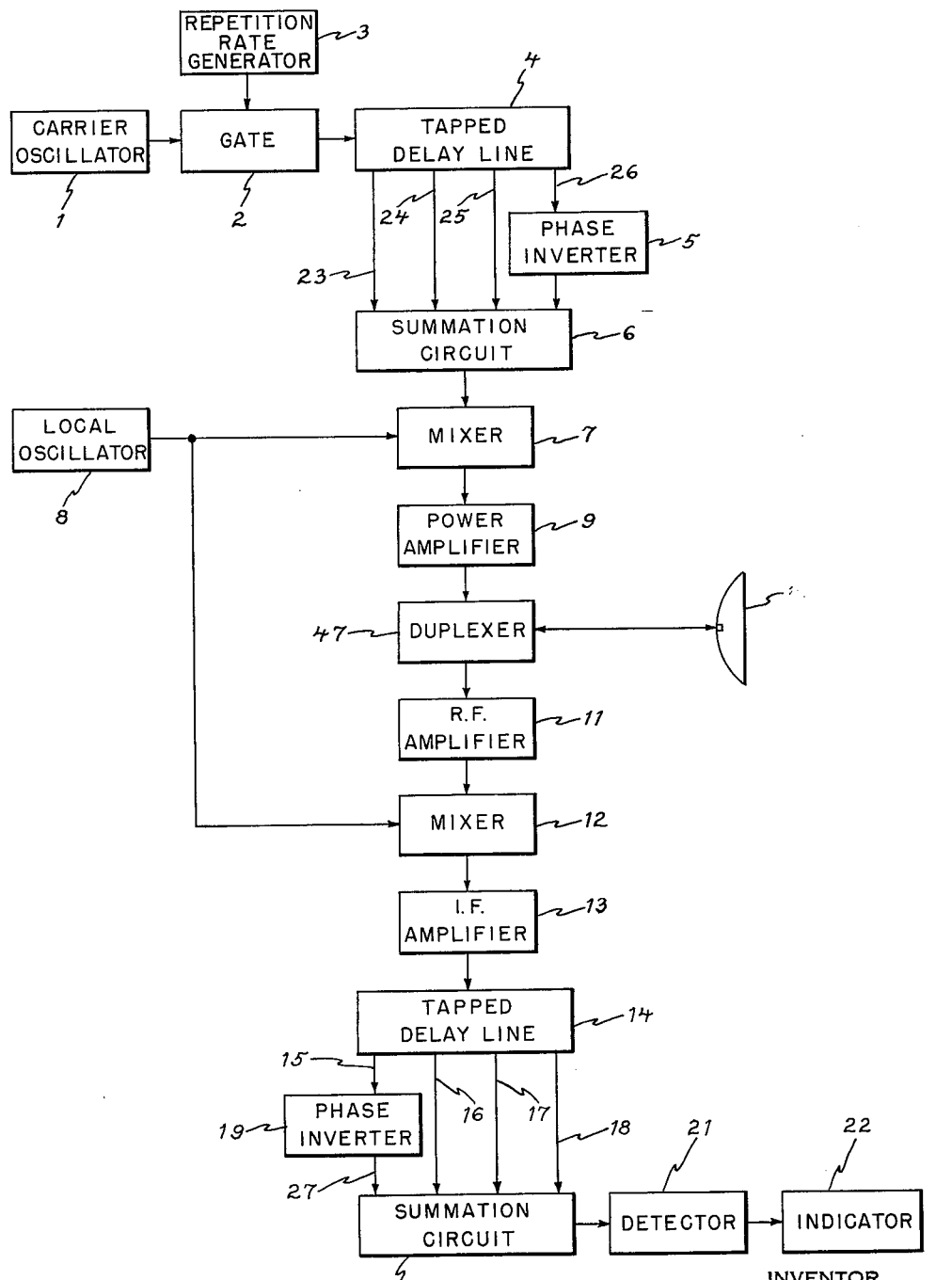

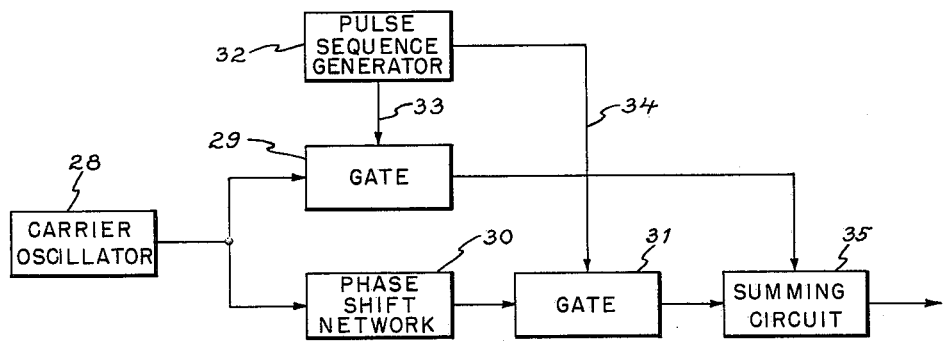
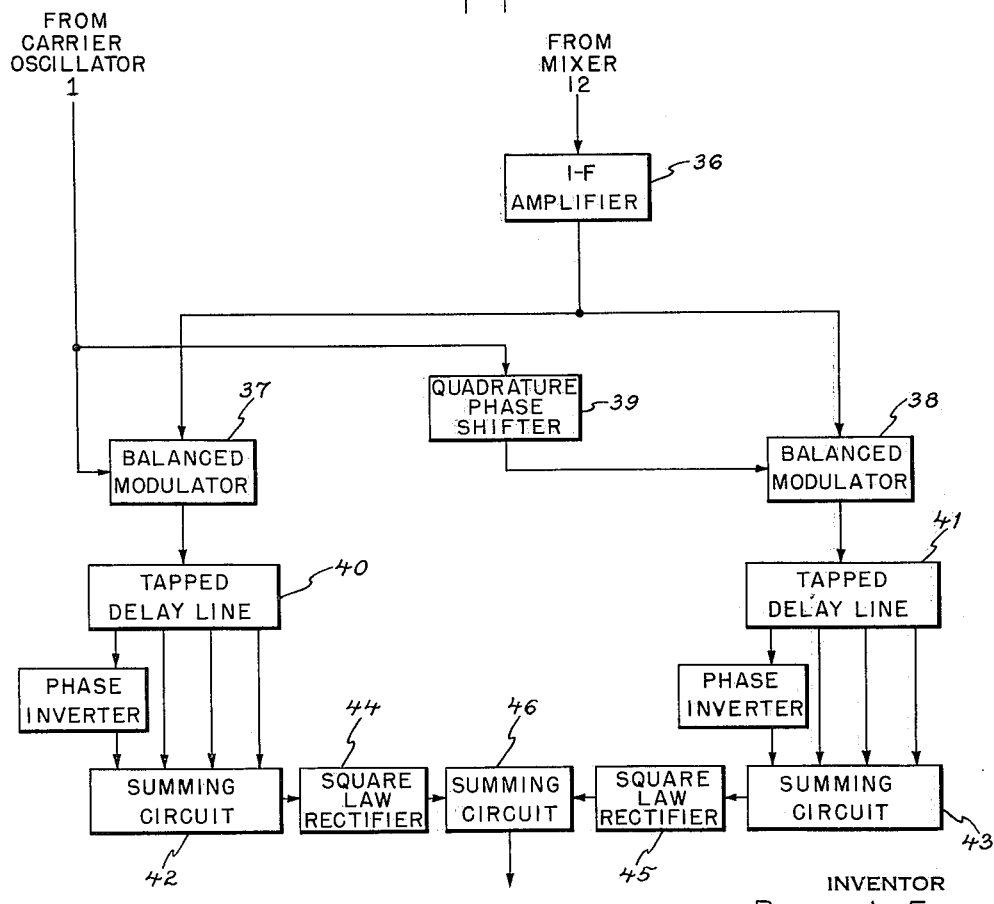

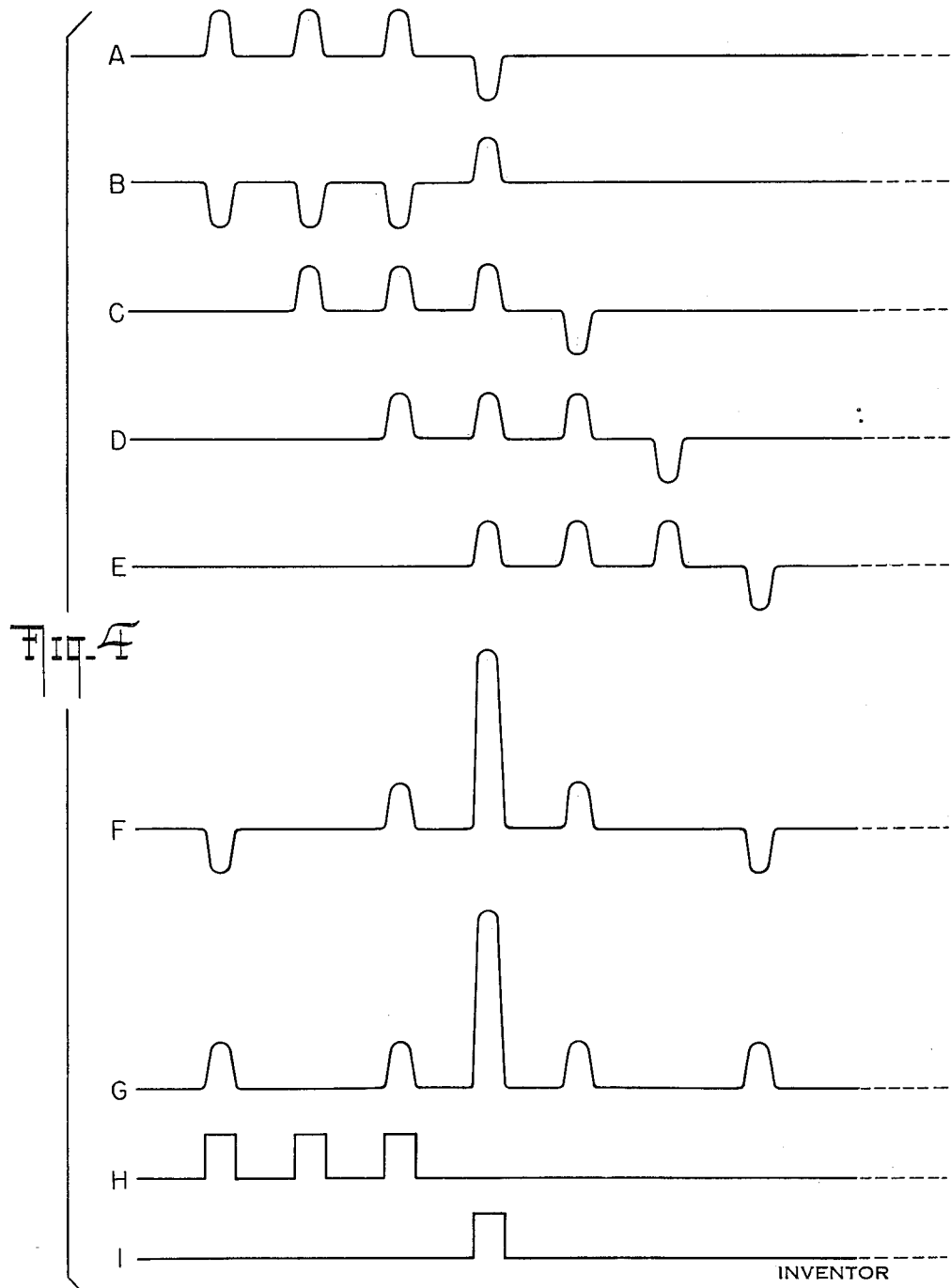

This invention relates to pulsed radar systems, and more specifically, is concerned with a pulsed radar system adapted to transmit groups of closely spaced pulses and including receiving means for compressing said group of pulses into one predominant pulse having an amplitude substantially equalling the sum of all the pulses in the transmitted group and having a duration substantially equal to a single pulse in the transmitted group.

It is well understood in the art that increased range coverage in a pulsed radar system can be achieved by increasing average transmitted power. As is also well known, range resolution is proportional to the duration of the transmitted pulses. Thus, where increased range coverage for a given range resolution is desired, the peak amplitude of the transmitted pulse may be increased in order to increase transmitted averager power. It is not possible, of course, to increase peak transmitted power without limit because of serious insulation problems which arise at the transmitter and transmitting antenna.

One proposed solution in the prior art to the problem of maintaining fixed amplitude transmitted pulses and a given range resolution while increasing range coverage is given in Patent 2,624,876 issued to R. H. Dicke on January 6, 1953. According to Dicke, a relatively long pulse is transmitted having a carrier whose frequency is "swept" from one value to another. The receiver for such a transmitted pulse incorporates a pulse compression filter having a characteristic such that the carrier components of the received pulse are delayed in amounts proportional to their frequencies so that the relatively low amplitude long duration transmitted pulse is "compressed" into a relatively high amplitude short duration pulse.

It is the general object of the present invention to increase range coverage in a pulsed radar system while maintaining a fixed amplitude transmitted pulse and a given range resolution.

A more specific object is to compress received phase modulated grouped pulses into a predominant single pulse by the use of apparatus having a uniform delay characteristic as a function of frequency.

Another object is to provide apparatus for receiving phase modulated grouped pulses and summing delayed versions of said pulses so as to produce a high amplitude short duration pulse.

These and other objects, as will become apparent as the description proceeds, are achieved according to the present invention by the incorporation of special modulating and demodulating apparatus, respectively, into an otherwise conventional radar transmitter and receiver. In one representative embodiment of the present invention, the radar transmitter includes a delay line carrier oscillator whose output is gated by a radar repetition rate generator. The gated carrier output is applied to the input of a tapped delay line whose outputs, into which predetermined amounts of phase shift are inserted, are summed together. The summing or combining of the individual phase shifted delay line outputs produces a group of pulses in response to each of the gated carrier pulses which are applied to the input of the delay line. The pulse groups recur at the radar repetition rate while each pulse of each group is separated by an amount corresponding to the electrical length between taps on the delay line. The summed or grouped pulses, having a carrier frequency as determined by the delay line propagation characteristic is mixed with a local oscillator to produce grouped pulses at the radar transmitter carrier frequency, which pulses are then radiated.

Upon reception, the pulses are mixed with the same oscillator for I.F. amplification purposes and then applied to a second tapped delay line into whose outputs are inserted predetermined amounts of phase shift complementary to those inserted in the transmitter tapped delay line. The outputs of the receiver tapped delay line are then summed together resulting in a pulse train in which there is one predominant pulse having an amplitude substantially equal to the total amplitude of the pulses comprising the received pulse group and having a duration substantially equal to the length of each pulse in said group. In addition to the predominant pulse response, there may also appear one or more spurious responses occurring, if at all, at times corresponding to the position of the individual pulses comprising the received group depending upon the amount of spurious pulse cancellation by a process to be described in detail later.

The summed output from the receiver tapped delay line may then be applied to a conventional radar indicator, for example, such as a type A indicator on whose face would appear a predominant high amplitude pulse and possibly one or more low amplitude spurious responses which are to be ignored for range measuring purposes. The range resolution of the predominant pulse is determined by the length of the transmitted pulses comprising each group.

For a better understanding of the present invention, reference should be had to the following description and the appended figures of which:

FIG. 1 is a representative embodiment of a radar transmitter-receiver modified according to the present invention; and FIG. 2 illustrates grouped pulse generation apparatus alternative to that shown in FIG. 1; and FIG. 3 discloses receiver detection apparatus alternative to that shown in FIG. 1; and FIG. 4 illustrates a number of waveforms useful in explaining the operation of FIG. 1.

In FIG. 1, the output of carrier oscillator 1 is applied to a first input of conventional electronic gate 2, a second input to which is derived from repetition rate generator 3. There appears at the output of gate 2 a number of cycles at the frequency of carrier oscillator 1 determined by the time duration of the pulse output of repetition rate generator 3. The output of gate 2 is applied to the input of a tapped delay line generally indicated by the numeral 4 having four outputs represented by the lines 23, 24, 25 and 26. In the example of FIG. 1, no phase shift is shown inserted in the output lines 23, 24 and 25 but a phase inverter 5 is shown in output line 26. The repetition rate of generator 3 is adjusted so that the interval between successive output pulses as applied to gate 2 is at least as great as the total time delay of delay line 4. Consequently, there appears at the output of conventional summation circuit 6, into which the output pulses appearing on lines 23, 24, 25 and 26 are fed, a series of four pulses which may be uniformly spaced in time according to the electrical length between taps along the delay line 4. Each series of four pulses results from a corresponding single pulse delivered to the input of delay line 4 by gate 2. In the event that the electrical length between taps is an integral multiple of delay line carrier wavelengths, the first three pulses occurring in time will have the same carrier phase while the fourth pulse will contain a carrier having an inverted phase with respect thereto as shown in waveform A of FIG. 4. The waveforms A through F inclusive of FIG. 4 are diagrammatic representations of pulses each containing a carrier having a relative phase as indicated by the polarity of the pulses.

The output of summation circuit 6 is applied to a first input of mixer 7, a second input to which is obtained from the output of local oscillator 8. The output of mixer 7, occurring at a convenient radar carrier frequency, is amplified in power amplifier 9 and radiated by antenna 10. Conventional duplexing apparatus is generally indicated by the numeral 47. Thus, groups of four pulses each are emitted by antenna 10, each group occurring at the radar repetition rate with the first three pulses in each group having a common carrier phase while the fourth pulse in each group has a carrier whose phase is displaced 180° with respect thereto.

The emitted exploratory grouped pulses reflect from a radar target in corresponding grouped fashion with the phase of the carrier in each pulse of the reflected groups bearing the same mutual phase relationship as existed between pulses comprising the transmitted group. The reflected pulse groups are received by antenna 10, amplified by R.F. amplifier 11 and applied to a first input of mixer 12. The second input to mixer 12 is obtained from local oscillator 8. The output of mixer 12, occurring at the same I.F. frequency as applied to transmitter delay line 4, is now applied to the input of receiver tapped delay line 14 similar to delay line 4 after amplification by I.F. amplifier 13. The outputs from delay line 14 appear on lines 15, 16, 17 and 18, line 15 having phase inverter 19 inserted therein.

Thus, there appears at the output of inverter 19 on line 27 waveform B of FIG. 4 which corresponds to the transmitted waveform A except that the carrier phase of each pulse has been inverted as represented by the inverted pulse polarities. Essentially the same series of four pulses as shown in waveform A appear on lines 16, 17 and 18 as shown in waveforms C, D, and E, respectively, of FIG. 4. It is to be noted that each of the waveforms C, D, and E are progressively delayed in time with respect to waveform B as determined by the electrical lengths between taps along delay line 14 to which lines 15, 16, 17 and 18 are respectively connected. The groups of four pulses each appearing on lines 27, 16, 17 and 18 are applied to a conventional summation circuit 20 yielding an output as represented by waveform F of FIG. 5. Waveform F is the result of the algebraic phase summation of waveforms B, C, D and E. Inasmuch as the first pulse of waveform B occurs alone in time it appears as the first pulse of output waveform F. The second pulse of waveform B and the first pulse of waveform C having opposite carrier phase mutually cancel out so that no corresponding pulse appears at the same time in waveform F. The third pulse of waveform B cancels the second pulse in waveform C. Since the first pulse of waveform D also occurs at the same time without any respectively opposing pulse of opposite carrier phase, a pulse corresponding in amplitude and shape to the first pulse of waveform D appears in waveform F. In the case of the fourth pulse of waveform B, the third pulse of waveform C, the second pulse of waveform D and the first pulse of waveform E, these pulses all occur in phase at the same time resulting in the predominant center pulse of waveform F whose amplitude is substantially equal to the in-phase summation of corresponding pulses contained in waveforms B, C, D and E. Following the predominant center pulse of waveform F, there also appear two additional pulses as a result of phase interference cancellation as previously described in connection with the first two small pulses contained in waveform F. Waveform F, appearing at the output of summation network 20, is applied to conventional amplitude detector 21 whose output is connected to radar indicator 22. Assuming, for example, that radar indicator 22 is a type A indicator, the amplitude detected waveform G of FIG. 4 will be indicated thereon.

It can be seen that by means of the delay line summation process incorporated in the radar receiver the energy contained in the received group of pulses has been effectively condensed into a predominant high amplitude pulse of high range resolution, inasmuch as the duration of the predominant pulse is determined by the length of any one pulse in each transmitted group of pulses. From one point of view, the transmitted group of four pulses, being narrowly spaced, may be considered as comprising a low amplitude long-time duration single pulse whose energy has been compressed into a relatively high amplitude short-time duration pulse in the radar receiver.

Alternative means of producing a series of grouped pulses containing programmed phase modulation is shown in FIG. 2. In FIG. 2 carrier oscillator 28 corresponds in frequency to carrier oscillator 1 of FIG. 1. The output of oscillator 28 is applied to gate 29 and 180° phase shift network 30, the latter corresponding to phase inverter 5 of FIG. 1. The output of phase shifter 30 is applied to a first input of gate 31. Second inputs to gates 29 and 31 are obtained from pulse sequence generator 32 which may be designed according to conventional practice to produce a total of four pulses three of which are shown in waveform H of FIG. 4 and appear on line 33, and one of which is shown in waveform I thereof and appears on line 34. Thus, a group of four pulses occurring at the radar repetition rate results from the time superpositioning of waveforms H and I. Gate 29 is caused to open for each of the three pulses of waveform H while gate 31 is opened by the pulse of waveform I. The outputs of gates 29 and 31 are applied to the inputs of summation circuit 35 whose output is equivalent to that shown in waveform A inasmuch as the first three pulses thereof have uniform phase while the fourth pulse has opposite phase as a result of the action of phase shift network 30, at the input of gate 31. The output of summation circuit 35 may then be connected to the first input of mixer 7 of FIG. 1 and the system of FIG. 1 will perform precisely as already described.

Alternative receiver detection apparatus to that shown in FIG. 1 is shown in FIG. 3. The advantage of the detection apparatus of FIG. 3 is that it permits the design of the receiver tapped delay lines at video frequencies rather than at I.F. frequencies which is the case of the receiver delay line of FIG. 1. In the alternative demodulation apparatus of FIG. 3 the output of mixer 12 of FIG. 1 is applied instead to the input of I.F. amplifier 36 of FIG. 3 corresponding to I.F. amplifier 13 of FIG. 1. The output of I.F. amplifier 36 is simultaneously applied to balanced demodulators 37 and 38, reference inputs to which are derived from the output of carrier oscillator 1 of FIG. 1. One of the reference inputs to balanced demodulators 37 and 38, for example, the input to balanced demodulator 38 is phase displaced by 90° by means of quadrature phase shifter 39. The function of the quadrature referenced demodulators 37 and 38 is more fully explained below. Each of the outputs of demodulators 37 and 38 are respectively applied to tapped delay lines 40 and 41. Each of the outputs of delay lines 40 and 41 correspond to the outputs of delay line 14 of FIG. 1 as are represented by waveforms B, C, D and E of FIG. 4 excepting that carrier frequency of the pulses at the outputs of delay lines 40 and 41 occur at a video frequency rather than at an I.F. frequency as is the case in FIG. 1. The outputs of delay lines 40 and 41 are summed in networks 42 and 43, respectively, in the same fashion as obtains in summing network 20 of FIG. 1. Each of the summed outputs of networks 42 and 43 are respectively applied to square law amplitude detectors 44 and 45 whose outputs are combined in summing circuit 46 whose output may then be applied to detector 21 of FIG. 1.

The purpose of the quadrature detection channels, each comprised of a balanced demodulator, tapped delay line, summation network and square law detector is to make the overall phase detection process insensitive to the relative phase displacement between the reference signal as obtained from carrier oscillator 1 of FIG. 1 and the target signal appearing at the output of I.F. amplifier 36. The principle of such quadrature detection is based on the trigonometric relationship of $\sin^2 \theta + \cos^2 \theta = $ unity, where $\theta=$ the angular displacement in phase between the signal and reference voltages applied to each of the balanced demodulators. Thus, the demodulators 37 and 38 produce outputs which may be represented, respectively, by $A \sin \theta$ and $A \cos \theta$ where A is the amplitude of the signal at the output of amplifier 36. Upon squaring and summing there results at the output of summing circuit 46 $A^2 \sin^2 \theta + A^2 \cos^2 \theta = A^2$. This technique is necessary in the alternative receiver detection embodiment of FIG. 3 inasmuch as it is recognized that the phase of the grouped pulsed carriers will vary as a function of target range and could not be detected with maximum amplitude by means of a reference signal applied to a single phase-sensitive demodulator which reference signal has constant phase as determined by carrier oscillator 1 of FIG. 1. The output of summation network 46 of FIG. 3 corresponds to the output of detector 21 of FIG. 1.

From the foregoing it is apparent that the objects of the present invention have been accomplished by the provision of a radar transmitter producing groups of pulses occurring at the radar repetition rate, each pulse comprised of a carrier having a predetermined phase relative to that of the carriers of the other pulses contained in a given group. The radar receiver provided by the present invention operates to delay the received pulse groups, to insert complementary phase shift into the delayed versions of the received pulse groups and then to combine the complementary phase shifted and delayed pulse groups to produce a predominant single pulse having an amplitude substantially equalling the total amplitude of the pulses comprising the received group and having a time duration substantially the same as the length of any one pulse contained in the received pulse group. According to the present invention, radar range coverage is increased without exceeding the peak power handling capabilities of the radar transmitter by the emission of a group of pulses each having an amplitude not exceeding the transmitter capacity thus effectively producing a low amplitude long-time duration pulse having relatively poor range resolution in its original condition but containing relatively high average power. Upon reception, however, the range resolution of the displayed target pulse is increased to the range resolution determined by the length of any one pulse in the transmitted group by effectively compressing the grouped transmitted pulses into a predominant single pulse.

It should be noted that the present invention is not limited to the particular relative phase between pulses comprising the transmitted group as described in connection with FIG. 1, but may be made to operate effectively by use of other mutual phase relationships which may involve the use of more or less than the four pulses shown in the illustrative waveforms of FIG. 4.

In the event that the time separation between successive taps along the transmitter delay line is less than the time duration of the pulses applied to the input thereof, the invention will operate to produce overlapping multiple pulses. Provided that the receiver delay line is tapped at equivalent points, however, the invention, by means of the phase summation process previously described, will still produce a predominant pulse response at the receiver whose duration is substantially that of the individual pulses comprising the multiple pulses.

Additionally, it should be recognized that the invention does not depend upon the use of phase shifting devices external to the transmitter and receiver delay lines. The required phase shift between the tapped outputs of the delay lines may be obtained by selecting taps mutually separated by distances corresponding to non-integral multiples of the delay line carrier wavelength.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A pulsed radar system comprising a transmitter and receiver, said transmitter including means for producing recurrent groups of pulsed oscillations, said groups occurring at the radar repetition rate, said means for producing including means for phase shifting at least one of the carriers of the pulsed oscillations within each group whereby the carriers of all the pulsed oscillations within each group do not have the same phase, and means for radiating said recurrent groups of phase shifted pulsed oscillations; said receiver including means to compress each group of received pulsed oscillations into a predominant single pulse having an amplitude substantially equalling the inphase summation of all the pulsed oscillations comprising each group and having a duration substantially equal to each of the pulsed oscillations comprising each group, said means to compress comprising first and second phase demodulating means each adapted to receive the groups of received phase shifted pulsed oscillations at first inputs thereto and first and second reference signals at second inputs thereto, said first and second reference signals having a quadrature phase relationship; first and second delay means each having a plurality of outputs for increasingly delaying a respective one of the outputs of said first and second demodulating means by incremental amounts each substantially equal to the time separation between the pulsed oscillations comprising said groups, each said output producing a respectively delayed output of said first and second demodulating means, first and second summing means respectively connected to the outputs of said first and second delay means, first and second rectifying means each connected to the output of a respective one of said summing means and third summing means adapted to receive the outputs of said first and second rectifying means.

2. A pulsed radar system comprising a transmitter and receiver, said transmitter including means for producing recurrent groups of pulsed oscillations, said groups occurring at the radar repetition rate, said means for producing including means for phase shifting at least one of the carriers of the pulsed oscillations within each group whereby the carriers of all the pulsed oscillations within each group do not have the same phase, and means for radiating said recurrent groups of phase shifted pulsed oscillations; said receiver including means to compress each group of received pulsed oscillations into a predominant single pulse having an amplitude substantially equalling the inphase summation of all the pulsed oscillations comprising each group and having a duration substantially equal to each of the pulsed oscillations comprising each group, said means to compress comprising first and second phase demodulating means each adapted to receive the groups of received phase shifted pulsed oscillations at first inputs thereto and first and second reference signals at second inputs thereto, said first and second reference signals having a quadrature phase relationship; first and second delay means for increasingly delaying a respective one of the outputs of said first and second demodulating means by incremental amounts each substantially equal to the time separation between the pulsed oscillations comprising said groups, each said means for delaying having a plurality of outputs at least one of which is connected to a respective phase shifting means; first and second summing means respectively connected to the outputs of said phase shifting means and the other outputs of said first and second delay lines; first and second rectifying means each connected to the output of a respective one of said summing means and third summing means adapted to receive the outputs of said first and second rectifying means.

3. Apparatus as defined in claim 2 wherein said phase shifting means comprises phase inverting means.

4. A pulsed radar system comprising a transmitter and receiver, said transmitter including means for producing recurrent groups of pulsed oscillations, said groups occurring at the radar repetition rate, said means for producing including means for phase shifting at least one of the carriers of the pulsed oscillations within each group whereby the carriers of all the pulsed oscillations within each group do not have the same phase and means for radiating said recurrent groups of phase shifted pulsed oscillations; said receiver including means to compress each group of received pulsed oscillations into a predominant single pulse having an amplitude substantially equalling the inphase summation of all the pulsed oscillations comprising each group and having a duration substantially equal to each of the pulsed oscillations comprising each group, said means to compress comprising means for increasingly delaying each group of received pulsed oscillations by incremental amounts substantially equal to the time separation between each pulse within each group to produce a plurality of increasingly delayed groups of pulsed oscillations, means for phase shifting the carrier of at least one of the delayed groups of pulsed oscillations and means for summing the phase shifted delayed groups of pulsed oscillations.

5. Apparatus as defined in claim 4 wherein said means for phase shifting comprises phase inverting means.

6. Apparatus as defined in claim 4 wherein said means for producing comprises a source of recurrent pulsed oscillations, a tapped delay line having an input and a plurality of outputs, the electrical length between at least two of the successive taps equalling a non-integral number of delay line carrier wavelengths, means for coupling said source to the input of said delay line and means for summing the outputs of the delay line.

7. Apparatus as defined in claim 4 wherein said means for producing comprises a source of recurrent pulsed oscillations, a tapped delay line having an input and a plurality of outputs, the electrical length between successive taps equalling an integral number of delay line carrier wavelengths, means for coupling said source to the input of said delay line, at least one phase shifting means each adapted to receive a respective one of the plurality of outputs of said delay line and means for summing the other outputs of the delay line with the outputs of the phase shifting means.

8. Apparatus as defined in claim 7 wherein the phase shifting means comprises phase inverting means.

9. Apparatus for compressing recurrent groups of pulsed oscillations, each pulse having a carrier whose phase bears a predetermined relationship to the other pulse carriers within a given group, said apparatus comprising in combination, first and second phase demodulating means each adapted to receive the group of received pulsed oscillations at first inputs thereto and first and second reference signals in second inputs thereto, said first and second reference signals having a quadrature phase relationship; first and second delay means for increasingly delaying a respective one of the outputs of said first and second demodulating means and producing a plurality of incrementally delayed outputs each increment being substantially equal to the time separation between pulsed oscillations comprising said groups, first and second summing means respectively connected to the outputs of said first and second delay means; first and second rectifying means each connected to the output of a respective one of said summing means and third summing means adapted to receive the outputs of said first and second rectifying means.

10. Apparatus for compressing recurrent groups of pulsed oscillations, each pulse having a carrier whose phase bears a predetermined relationship to the other pulse carriers within a given group, said apparatus comprising in combination, first and second phase demodulating means each adapted to receive the groups of received pulsed oscillations at first inputs thereto and first and second reference signals at second inputs thereto, said first and second reference signals having a quadrature phase relationship; first and second delay means for increasingly delaying a respective one of the outputs of said first and second demodulating means by incremental amounts each substantially equal to the time separation between the pulsed oscillations comprising said groups, each said means for delaying having a plurality of outputs at least one of which is connected to a respective phase shifting means; first and second summing means respectively connected to the outputs of said phase shifting means and the other outputs of said first and second delay means; first and second rectifying means each connected to the output of a respective one of said summing means and third summing means adapted to receive the outputs of said first and second rectifying means.

11. A pulsed radar system comprising a transmitter and receiver, said transmitter including means for producing recurrent groups of pulsed oscillations, the time spacing between the successive groups of said pulsed oscillations being greater than the time spacing between the successive pulsed oscillations comprising each group, said groups occurring at the radar repetition rate, said means for producing including means for phase shifting at least one of the carriers of the pulsed oscillations within each group whereby the carriers of all of the pulsed oscillations within each group do not have the same phase, and means for radiating said recurrent groups of phase shifted pulsed oscillations; said receiver including means for increasingly delaying each group of received pulsed oscillations by incremental amounts substantially equal to the time separation between each pulse within each group to produce a plurality of increasingly delayed groups of pulsed oscillations, and means for summing the delayed groups of pulsed oscillations.

References Cited in the file of this patent
UNITED STATES PATENTS
2,677,128   Spaulding et al. _____ Apr. 27, 1954